United States Patent [19]

Nakanishi et al.

[11] Patent Number: 4,654,822

[45] Date of Patent: Mar. 31, 1987

[54] MEMO-PRINT ELECTRONIC APPARATUS

[75] Inventors: Yasuhiro Nakanishi; Toshihiko Sumitani, both of Nara, Japan

[73] Assignee: Kabushiki Kaisha - Sharp, Osaka, Japan

[21] Appl. No.: 498,040

[22] Filed: May 25, 1983

[30] Foreign Application Priority Data

May 25, 1982 [JP] Japan .................................. 57-89252
Jun. 4, 1982 [JP] Japan .................................. 57-96789

[51] Int. Cl.$^4$ ........................ G06F 3/12; G06F 15/02
[52] U.S. Cl. .................................... 364/900; 364/705
[58] Field of Search ... 364/705, 709, 710, 900 MS File

[56] References Cited

U.S. PATENT DOCUMENTS

| | | | |
|---|---|---|---|
| 3,911,424 | 10/1975 | Gianuzzi et al. | 364/709 X |
| 4,016,542 | 5/1977 | Azure | 364/900 |
| 4,106,101 | 8/1978 | Harrison | 364/709 |
| 4,117,542 | 9/1978 | Klausner et al. | 364/709 X |
| 4,279,021 | 7/1981 | See et al. | 364/709 X |
| 4,279,022 | 7/1981 | Abe | 364/705 X |
| 4,290,113 | 9/1981 | Maker et al. | 364/709 X |
| 4,402,056 | 8/1983 | Sado et al. | 364/709 X |
| 4,408,292 | 10/1983 | Nakatani et al. | 364/710 |
| 4,530,068 | 7/1985 | Nakanish et al. | 364/900 |

*Primary Examiner*—James D. Thomas
*Assistant Examiner*—David L. Clark
*Attorney, Agent, or Firm*—Birch, Stewart, Kolasch & Birch

[57] ABSTRACT

An electronic calculator includes a mode selection key and a memo mode selection key. The mode selection key is actuated to select a memo mode for inputting and printing out memo data and a calculation mode for operating arithmetic calculation. The memo mode selection key is actuated to absolutely select the memo mode during the calculation mode. Once the memo mode selection key is actuated and a print key is actuated to print out the memo data, the calculation mode is reselected, automatically, so that the calculator can continue to calculate.

3 Claims, 22 Drawing Figures

```
      TEL    CALL    FROM
ABC   COMPANY
```

```
             123.—
DISCOUNT
              10.%
           110.7 *
```

FIG.6

| IMA | DPA |
|---|---|
| DCC | |

| UP | DW | F |
|---|---|---|

MEMO-PRINT ELECTRONIC APPARATUS

BACKGROUND OF THE INVENTION

The present invention relates to an electronic apparatus and, more particularly, to an electronic apparatus for inputting and printing memo information in addition to information normal to the apparatus.

Conventional memo-print electronic calculators normally include a printing mode and a calculation mode. The printing mode functions to store memo data inputted with alphanumeric keys including alphabet and numerical keys. The memo data include a message, a comment or the like used for the operator. This data is printed in response to the actuation of a print command key. The calculation mode is operated to calculate in accordance with calculation data inputted with the numerical keys and function keys. The calculated results are printed, also.

Since the manual operation of these calculators is rather complicated, it is desirable to simplify the necessary manual operation of these calculators.

OBJECT AND SUMMARY OF THE INVENTION

Accordingly, it is an object of the present invention to provide an improved electronic apparatus for inputting and printing out memo data in addition to information normal to the apparatus.

It is another object of the present invention to provide an improved electronic calculator for selecting a memo mode for inputting and printing out memo data during a calculation mode.

It is a further object of the present invention to provide an improved electronic calculator for automatically returning from a memo mode for inputting and printing out memo data to a calculation mode for calculating.

It is a further object of the present invention to provide an improved electronic calculator for displaying memo data in a unit of a single line before printing out the memo data.

Briefly described, in accordance with the present invention, an electronic apparatus including an electronic calculator comprises a mode selection key, and a memo mode selection key. The mode selection key is actuated to select a memo mode for inputting and printing out memo data and a calculation mode for operating arithmetic calculation. The memo mode selection key is actuated to absolutely select the memo mode during the calculation mode. Once the memo mode selection key is actuated to select this mode and a print key is actuated to print out the memo data, the calculation mode is re-selected, automatically, so that the calculator can continue to calculate.

In a specific form of the present invention, the electronic calculator can display the memo data in a unit of a single line before printing it out.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
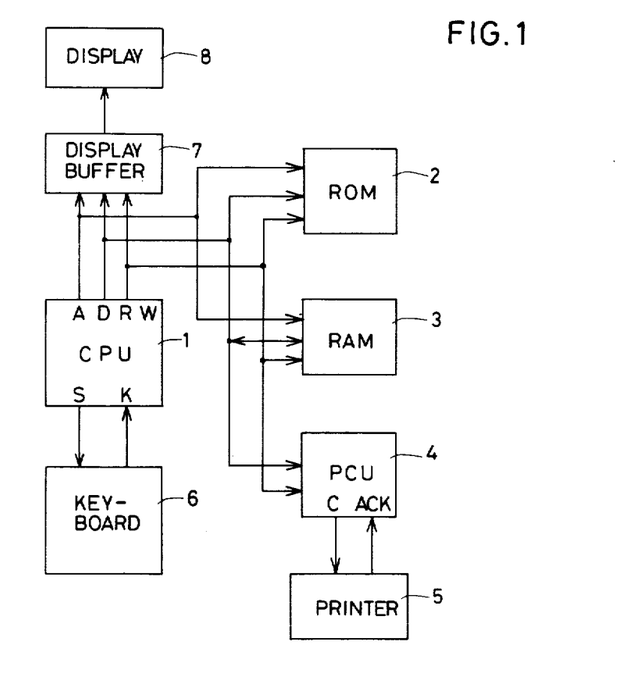
FIGS. 1 and 5 show a block diagram of a circuit implemented within an electronic calculator according to the present invention.

FIG. 1 shows a block diagram of a circuit implemented within an electronic apparatus according to the present invention. In terms of a preferred embodiment of the present invention, the electronic apparatus is an electronic calculator. Any other devices such as timepieces can also be utilized with the present invention.

The circuit of FIG. 1 comprises a CPU 1, a ROM 2, a RAM 3, a printer controller(PCU)4, a printer 5, a keyboard 6, a display buffer 7 and a display 8.

The CPU 1 causes key inputted information to be read in in accordance with the steps recorded in the ROM 2. The CPU 1 further operates, so that the contents of the RAM 3 are transferred into the display buffer 7 to display them in the display 8, or that the contents of the RAM 3 are transferred into the PCU 4 to print them out in the printer 5.

The ROM 2 stores programs necessary for reading, displaying, or printing out the data, or for calculating in accordance with the numerical data and the formulas stored in the RAM 3.

The RAM 3 includes a storage area, a conditional area, and a counting area. The storage area is used for storing key inputted data including numerical data, character data, or formula data, and the calculated results. The conditional area is used, as described below, for flags used in executing the operation of the CPU 1. The counting area is used, as described below, for serving to count.

The PCU 4 is responsive to the numerical or the character data transferred from the CPU 1 for generating patterns specific to individuals of the numerical or the character data and for permitting the printer 5 to print out the specific patterns.

The keyboard 6 includes ten numerical digit (0–9) keys, alphabet (A–Z) keys, specific symbol keys, some arithmetic-function keys, and extra keys according to the present invention. These keys are all arranged in a matrix form as defined with terminals for receiving key strobe signals developed from the CPU 1 and others for outputting common signals into the CPU 1.

Additionally, there are provided a print key and a mode selection key in the keyboard 6. The mode selection key is actuated for selecting a memo mode and a calculation mode. The memo mode is referred to a "TYPE" mode hereinafter and in this case no calculation is performed except that the RAM stores the key inputted data including the numerical, the character, and symbol data and this data is printed out in response to the actuation of a print command key. The calculation mode is referred to a "COMP" mode hereinafter and to the case where the calculation is performed uninterrupted.

The display buffer 8 is responsive to the numerical or the character data transferred from the CPU 1 for converting and outputting display data suitable for the display 8, so that the display 8 can show the display data.

Figure 2:
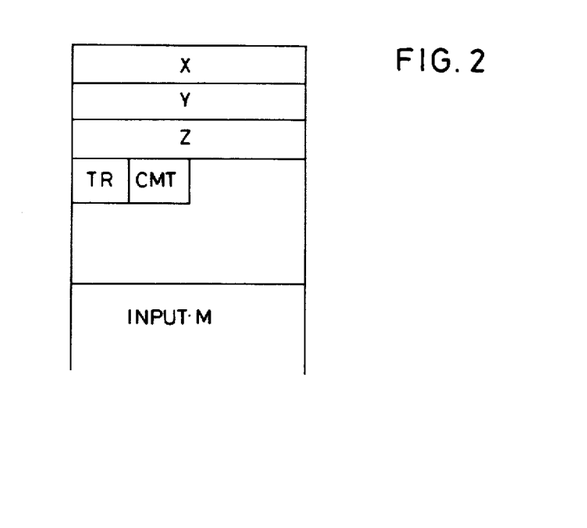
FIGS. 2 and 6 show a structure of a RAM connected in each of the circuits of FIGS. 1 and 5.

FIG. 2 shows the contents of the RAM 3. The RAM 3 includes three registers X, Y, and Z, two flags TP and CMT, an input memory "INPUT.M". The input memory is used to store key inputted data during the memo mode. Each of the registers and the flags provides the following operation:

The registers X, Y, and Z are calculation registers used in the calculation mode for storing the key inputted numerical or the calculated data.

The flag TP is set in response to the selection of the memo mode and reset in response to the selection of the calculation mode.

The CMT flag is set in response to the actuation of any comment key selected from the keys in the keyboard 6 to input some memo or comment data, and reset in response to the completion of printing out the data. This set and the reset operation are effective only during the calculation mode.

Figure 3:
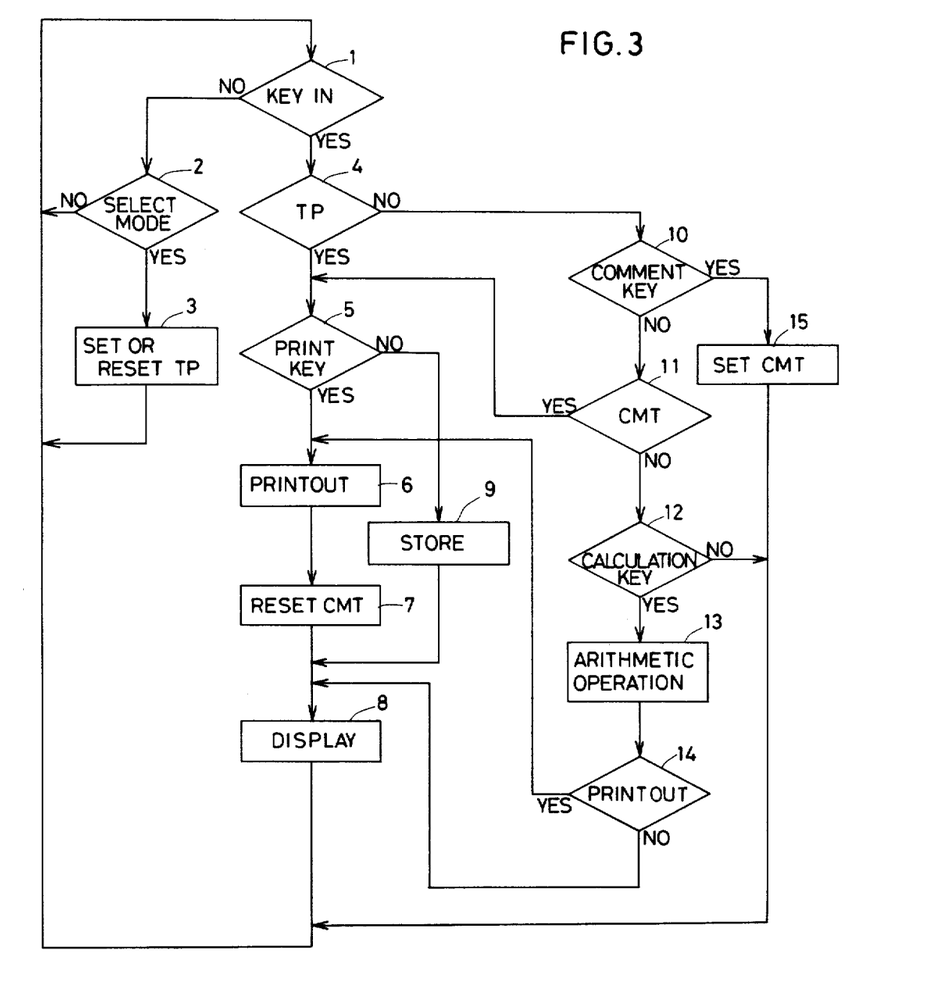
FIGS. 3 and 7 show a flow chart of the operation of each of the calculators of FIGS. 1 and 5.

FIG. 3 shows a flow chart of the operation of the calculator of FIG. 1.

Stpe 1: It is detected whether some key is actuated. When some key is actuated, step 4 is selected.

Step 2: It is detected whether some mode is selected. When some mode is selected, step 3 is selected.

Step 3: When the TYPE mode is selected, the TP flag is set. When the COMP mode is selected, the TP flag is reset.

Step 4: It is detected whether the TP flag is set or reset. When it is set, meaning that the TYPE mode is selected, step 5 is executed. When it is reset, meaning that the COMP mode is selected, step 10 is selected.

Step 5: It is detected whether the print command key is actuated or not. When this key is actuated, step 6 is selected to print out the data, so that step 7 is selected to reset the CMT flag. In step 6, the contents of the X register or the input memory in the RAM 3 for storing the calculated results are printed out.

Step 7: The CMT flag is reset, so that the selection of the TYPE mode during the COMP mode is released. After printing out the data, the COMP mode is automatically returned.

Step 8: This step is executed to process the key inputted data and display the calculated results.

Step 9: This step is selected when it becomes evident in step 5 that the print command key is not actuated, to thereby detect the selection of the TYPE mode. In step 9, the key inputted data are entered into the input memory in the RAM 3.

Step 10: It is detected whether some comment key is actuated in the COMP mode. When it is actuated, step 15 is selected to set the CMT flag.

Step 11: It is detected whether the CMT flag is set or reset. When it is set, step 5 is selected to process the data in the TYPE mode. Thereafter, until the CMT flag is reset, the similar operation to the TYPE mode is carried out. The registers useful for the COMP mode are isolated by these operations. Responsive to the detection of step 11 for the CMT flag, and the set/reset detection of the flag CMT in steps 15 and 7, it becomes possible, in the COMP mode, the TYPE mode can be executed.

Step 12: It is detected whether the calculation command key is actuated or not, which is effective in the COMP mode.

Step 13: The calculation is performed when the calculation key is actuated.

Step 14: It is detected whether the calculated results shoud be printed out or not.

Thus, in the COMP mode, the comment key is actuated to tentatively select the TYPE mode for inputting and printing out the comment data. After these memo data are printed out, the COMP mode is automatically selected and returned to continue to calculate.

Figure 4A:
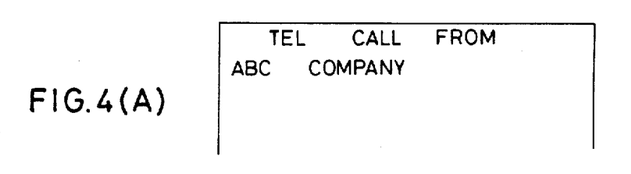
FIGS. 4(A) to 4(C) show examples of printing out the data.
Figure 4B:
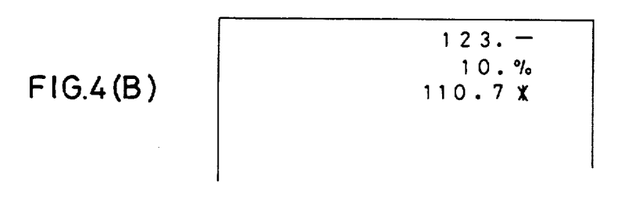
Figure 4C:
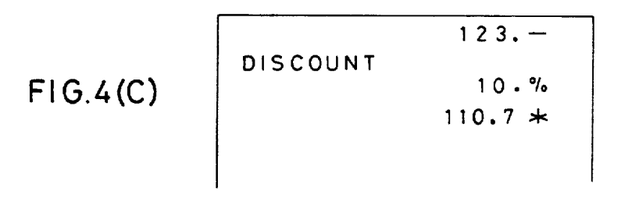

FIGS. 4(A) to 4(C) show print examples according to the present invention.

FIG. 4(A): In the TYPE mode, after the key data are inputted, the memory data are printed out at once.

FIG. 4(B): In the COMP mode, the calculated results are printed out.

FIG. 4(C): In the COMP mode, the comment key to input some comment is actuated in the middle of the calculation to thereby select the TYPE mode for inputting and printing out the memo data. After the TYPE mode, the COMP mode is re-selected to continue the calculation.

Attention is directed to another preferred form of the present invention.

Figure 5:
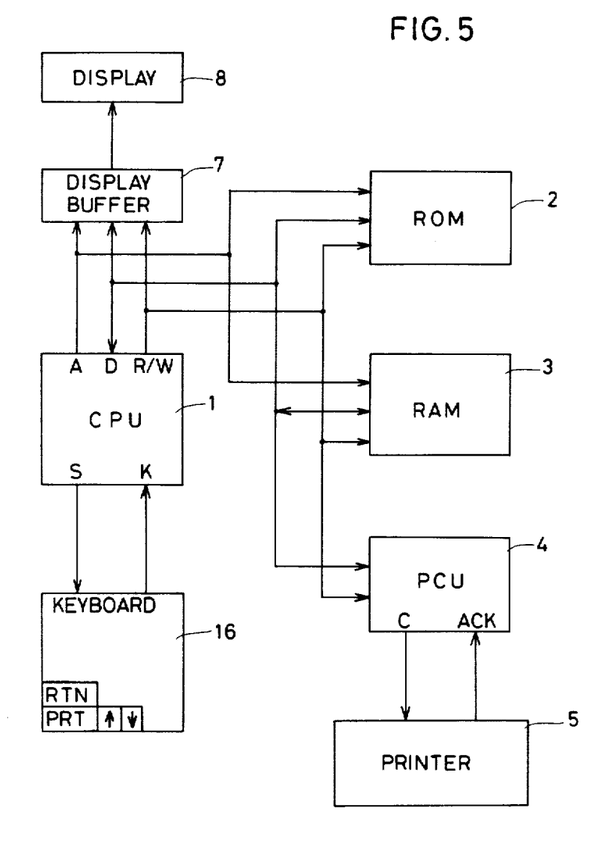

FIG. 5 shows a circuit implemented within the calculator of the present invention. The principal circuit elements of FIG. 5 are similar to those of FIG. 1 except that the keyboard 6 in FIG. 1 is replaced by another type keyboard 16 comprising a print key "PRT", a return key "RTN", an upper scroll key "↑", and a lower scroll key "↓" according to this preferred embodiment.

The print key "PRT" is similar to the print command key as described with reference to FIG. 1.

Figure 6:
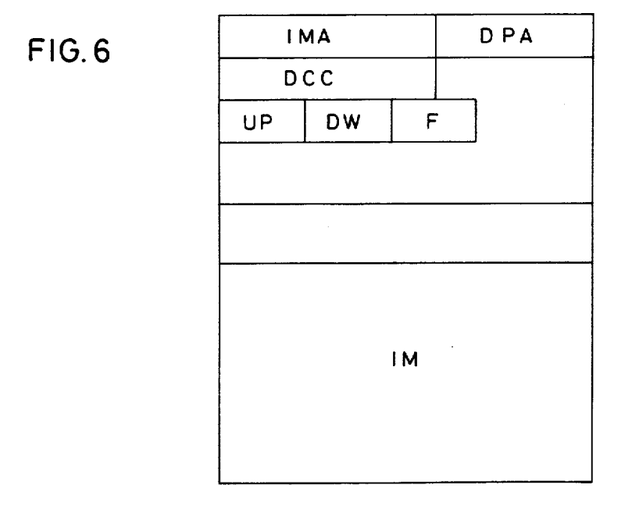

FIG. 6 shows the contents of the RAM 3 as connected in the circuit of FIG. 5.

The RAM 3 in the circuit of FIG. 4 comprises three counters IMA, DPA, and DCC, three flags UP, DW, and F. As stated above in connection with FIG. 2, the input memory IM stores the key inputted data in the TYPE mode.

Each of the counters and the flags operates as follows:

The IMA counter stores the position of a cursor in the input memory. The key inputted data is recorded as data codes into a location directed by this IMA counter.

The DPA counter stores a position in the input memory IM. The data in the input memory IM following this position is displayed.

The DCC counter stores the number of the figures contained within the display data, to indicate whether the display data exceeds the figure capacity of a single line.

The UP flag is set when some display data is present prior to the presently displayed data, and reset in other cases.

The DW flag is set when some display data is present after the presently displayed data, and reset in other cases.

The F flag is reset when a return code related to the actuation of the return key is stored for preceding the stored data representative of the presently displayed data, and reset in other cases.

Figure 7:
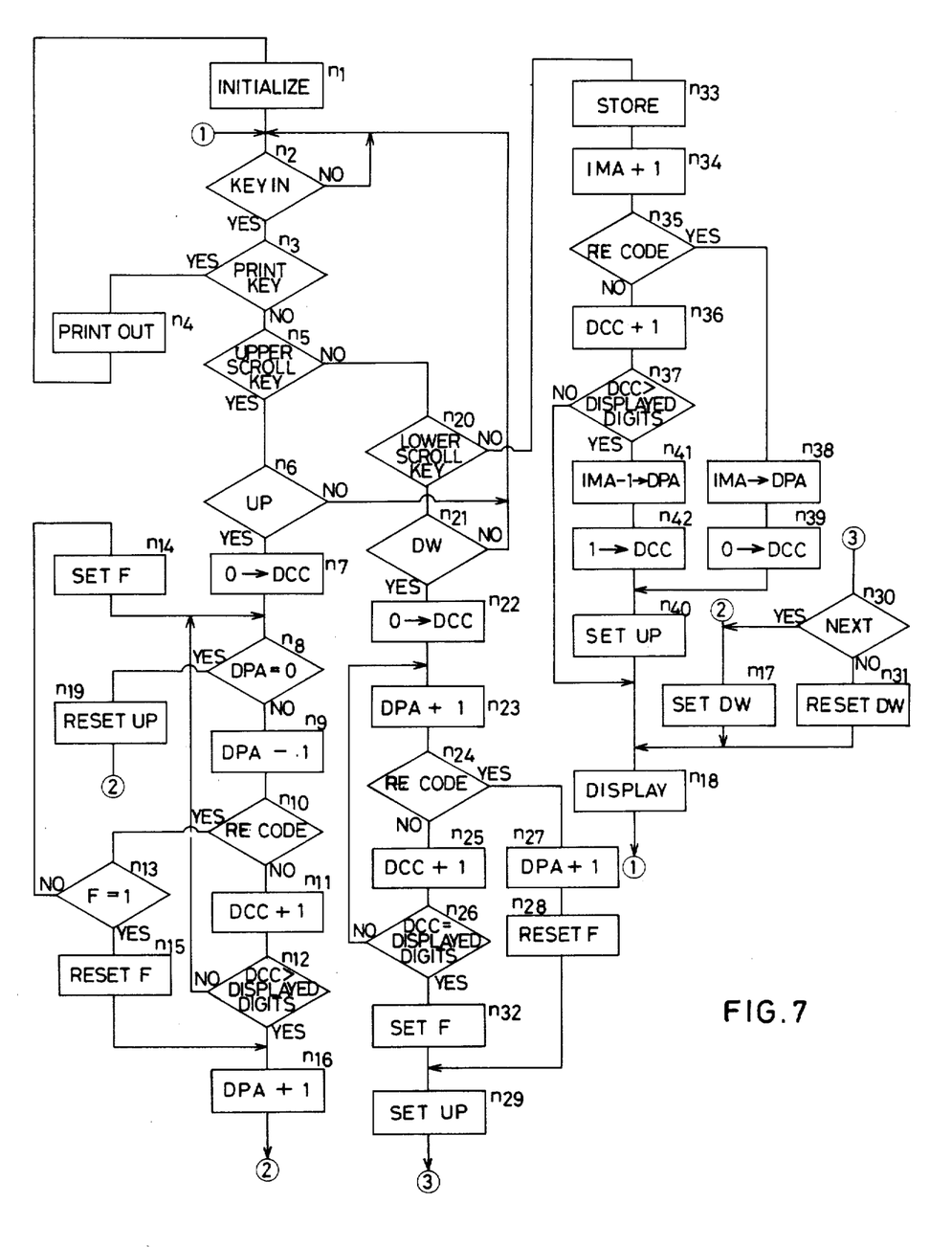

FIG. 7 shows a flow chart of the circuit operation of FIG. 5.

Step n1: The counters and the flags are all reset to initialize them.

Steps n2-n3-n5-n20-n33-n34: When some key of the character keys, the digit keys, the symbol keys, the return key "RTN" is actuated, the character codes or the return code "RE" corresponding to the actuated key are recorded into a location in the inut memory IM as directed by the contents of the IMA counter. To prepare to receive the following key input, the IMA counter is counted up by "1".

Steps n35-n36-n37: It is detected whether the now recorded data is the return code or not. When not, the DCC counter is counted up by "1". It is detected whether the contents of the DCC counter represent information exceeding the figures of the display 8.

Step n18: When "NO" is detected in step n37, the display routine is directly selected to display the presently stored data inputted.

Steps n35-n38-n39-n40-n18: When the return key is actuated, the contents of the IMA counter are transferred into the DPA counter to renew the contents of the DPA counter. Thus, the position of the present cursor is set to a new position for starting a display. The DCC counter is reset and the UP flag is set, so that the display routine is selected.

Steps n37-n41-n42-n40-n18: When it is detected that the contents of the DCC counter represent information exceeding the figures of the display 8, "1" is subtracted from the contents of the IMA counter, so that the results are transferred into the DPA counter. Thus, the contents of the DPA counter are renewed, whereby the position, to which the character code or the like is recorded just previously, is set to be a new position for starting a display. "1" is entered into the DCC counter because at least a single character or symbol has been inputted when the position for starting the display is renewed. The UP flag is set to thereby select the display routine.

Figure 8A:
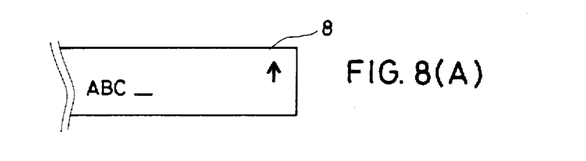
FIGS. 8(A), 8(B), 9(B), 9(D), 9(F), and 10(B) to 10(D) show display examples developed by a display according to the present invention.

When the UP flag is set, meaning that some display information is present in the input memory IM prior to the presently displayed data, the display routine is executed to display an upper scroll key " ↑ " at the right side of the display as shown in FIG. 8(A).

Figure 9A:
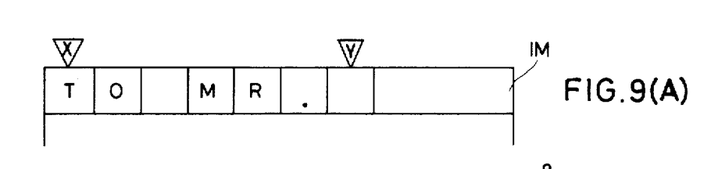
FIGS. 9(A), 9(C), 9(E) and 10(A) show the contents of an input memory IM.
Figure 9B:
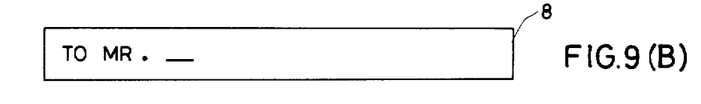
Figures 9C, 9D:
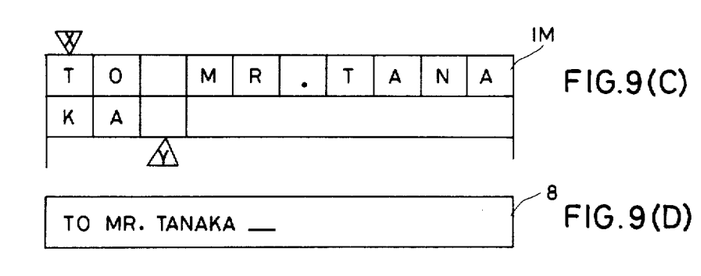
Figures 9E, 9F:
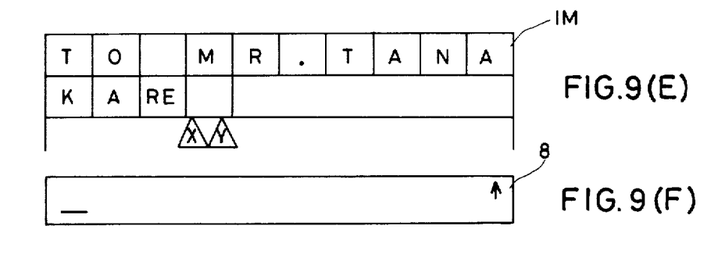

FIGS. 9(A), 9(C), and 9(E) show the content example of the input memory IM. FIGS. 9(B), 9(D) and 9(F) show the display examples of the display 8. FIGS. 9(A) and 9(B), 9(C) and 9(D), and 9(E) and 9(F) are related, respectively. FIGS. 9(E) and 9(F) show the case just after the return key is actuated.

In these figures,      and      indicate the position directed by the contents of the DPA counter to represent the position for starting the display.      and      indicate the position directed by the contents of the IMA counter to represent the position of the present cursor.

THE OPERATION FOR SUBSEQUENTLY DISPLAYING IN A UNIT OF A SINGLE LINE THE MEMO DATA STORED IN THE INPUT MEMORY IM

It is assumed that the following memo data are inputted:
 TO MR. TANAKA
 TELL CALL FROM
 ABC CORP.

Figure 10A:
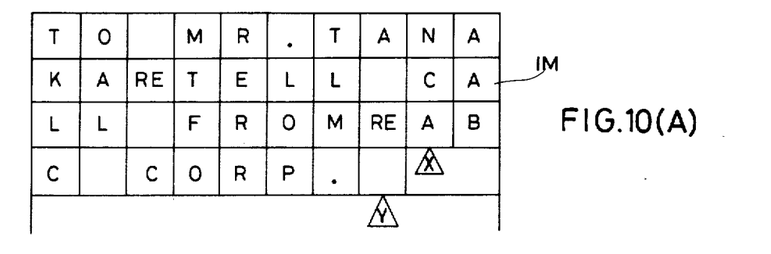
Figure 10B:
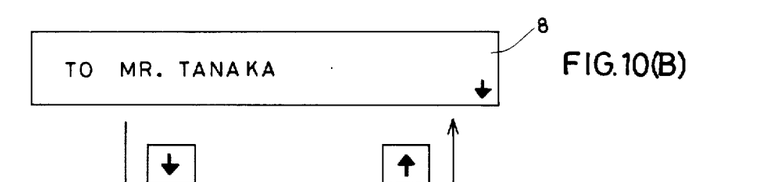
Figure 10C:
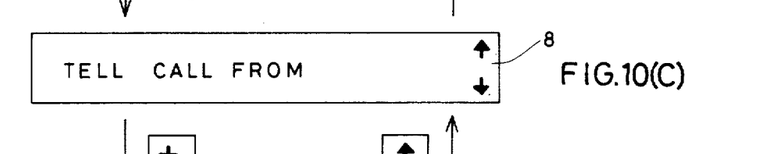
Figure 10D:
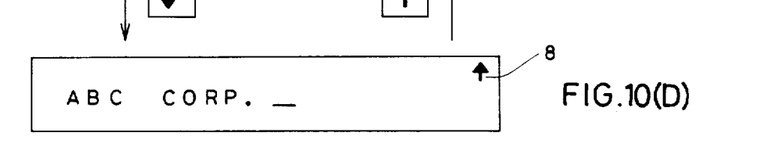

When the above data have been inputted, the contents of the input memory IM and the display example of the display 8 are shown in FIGS. 10(A) and 10(D).

Turning back to the flow chart of FIG. 7, the following operation is continued.

Steps n2-n3-n5-n6-n7-n8: When the upper scroll key " ↑ " is actuated, the DCC counter is reset. It is detected whether the DPA counter is in its initial condition or not.

Steps n8-n9-n10: Since the above detection is "NO", the DPA counter is counted down by "1". It is detected whether the position is related to the return code or not.

Steps n10-n13: Since "YES" is detected, the condition of the F flag is searched.

Step n14: Since the F flag is reset, step n14 is selected to set the F flag.

Steps n8-n9: These steps are selected to count down the contents of the DPA counter by "1", following the operation of step n14.

Step n10: It is detected whether the position contents are the return code.

Step n11: This step is selected since "NO" is detected in step n10. The DCC counter is counted up by "1".

Step n12: It is detected whether the contents of the DCC counter represent information exceeding the figures of the display 8. Since "NO" is detected, step n8 is re-selected. Steps n9-n10 are further selected.

Until the return code is detected, the loop including steps n11-n12-n8-n9-n10 is repeated.

Once the return code is detected, steps n10-n13 are selected to search the condition of the F flag. At this time, the F flag is set, so that steps n13-n15 are selected to reset the F flag.

Step n16: The DPA counter is counted up by "1".

Step n17: The DW is set to thereby select the display routine of step n18.

Figure 8B:
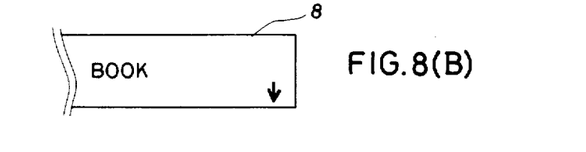

In the display routine, the data in the input memory IM following the position directed by the DPA counter are displayed. Once the return code is present, no further data are displayed. When the DW flag is set, meaning that some display data are stored in the input memory IM following the presently displayed data, the display routine is executed to display the lower scroll symbol " ↓ " at the right side of the display 9 as shown in FIG. 8(B). FIG. 10 shows a display example in this case.

In repeating the loop including steps n11-n12-n8-n9-n10, when the contents of the DCC counter represent information exceeding the figures of the display 8, steps n16-n17 are executed to select the display routine.

When the upper scroll key is further actuated, operations similar to the above described operations are repeated except the following. In this case, during executing the repetition of the loop, DPA=0 is detected.

Step n19: The UP flag is reset.
Step n17: The DW flag is set.
Thereafter, step n18 as the display routine is selected. FIG. 10(B) shows a display example in this case.

When the lower scroll key " ↓ " is actuated, the following operations are conducted.

Steps n2-n3-n5-n20-n21-n22-n23-n24: While the display of FIG. 10(B) is enabled, the lower scroll key is actuated, so that the DCC counter is reset and "1" is added to the contents of the DPA counter. It is detected whether the information of the present position is the return code or not.

Step n25: This step is selected since "NO" is detected in step n24. In step n25, "1" is added to the contents of the DCC counter.

Step n26: It is detected whether the contents of the DCC counter represent information equal to the figures of the display 8.

Step n23: This step is re-selected since "NO" is detected in step n26. In step n23, "DPA+1" is calculated. Step n24 is selected next.

Until the return code is detected, the loop including steps n25-n26-n23-n24 is repeated. Once the return code is detected, step n27 is selected.

Step n27: "1" is added to the contents of the DPA counter.

Step n28: The F flag is reset.

Step n29: The UP flag is set.

Step n30: It is detected whether some display data is present or not, following the next displayed data.

In this case, some further display data is present, so that steps n30-n17 are selected to set the DW flag. Step n18 of the display routine is selected. FIG. 10(C) shows a display example of this case.

Besides, during repeating the loop including steps n25-n26-n23-n24, when it is detected that the contents of the DCC counter represent information equal to the figures of the display 8, steps n26-n32 are selected to set the F flag. Thereafter, the operations following step n29 are executed.

When the lower scroll key is further actuated, operations similar to the above described operations are conducted except the operations following step n30. In step n30, "NO" is detected, so that steps n30-n31 are selected to reset the DW flag. Thereafter, the display routine of step n18 is selected. FIG. 10(D) shows a display example of this case.

As the flow chart of FIG. 7 shows, while the F flag or the DW flag is reset, the actuation of the upper or the lower scroll key is not effective.

THE OPERATION FOR PRINTING OUT THE MEMO DATA

BY operating the upper or the lower scroll key, the memo data is displayed in a unit of a single line, subsequently. When no error is confirmed, the print key "PRT" is actuated to select steps n2-n3-n4-n1 for printing out the memo data.

Figure 11:
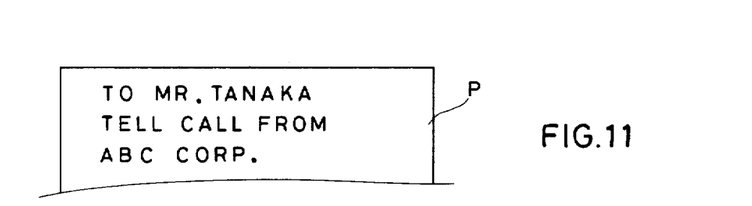
FIG. 11 shows a printed format representative of memo data on a printed paper.

FIG. 11 shows a print example printed on a paper P in this case.

While only certain embodiments of the present invention have been described, it will be apparent to those skilled in the art that various changes and modifications may be made therein without departing from the spirit and scope of the present invention as claimed.

What is claimed is:

1. An electronic apparatus normally operable to function for a primary use comprising:
   mode selecting means for selecting a normal mode or a memo mode, said normal mode enabling said apparatus to function in its primary use and said memo mode enabling said apparatus to print out selected memo data; p1 means for temporarily selecting said memo mode during an operation of said apparatus in said normal mode;
   means for introducing numeric data into said apparatus in either of said normal mode or said memo mode;
   means for introducing alphanumeric memo data into said apparatus only in said memo mode;
   said memo mode being selectable either by said mode selecting means or by said means for temporarily selecting said memo mode;
   detection means for detecting whether said memo data is to be printed out;
   printing means, responsive to said detection means, for printing out said memo data introduced by said means for introducing alphanumeric data; and
   means for automatically reselecting said normal mode absent any key actuation of said apparatus when completion of printing by said printing means occurs.

2. The apparatus of claim 1, wherein the apparatus comprises a calculator which performs calculations during the normal mode.

3. The apparatus of claim 1, further comprising:
   register means for storing data used in said normal mode and said alphanumeric memo data when in said memo mode;
   first flag means being set when said memo mode is selected and reset when said normal mode is selected; and
   second flag means being set when any key is actuated to introduce said alphanumeric memo data, and reset when said memo data is printed out.

* * * * *